(12) United States Patent
Wallerstorfer

(10) Patent No.: US 12,358,811 B2
(45) Date of Patent: Jul. 15, 2025

(54) FILTER CARTRIDGE

(71) Applicant: ACLARIS WATER INNOVATIONS GMBH, LINDAU, ZWEIGNIEDERLASSUNG REBSTEIN, Rebstein (CH)

(72) Inventor: Kurt Wallerstorfer, Strasswalchen (AT)

(73) Assignee: ACLARIS WATER INNOVATIONS GMBH, LINDAU, ZWEIGNIEDERLASSUNG REBSTEIN, Rebstein (CH)

( * ) Notice: Subject to any disclaimer, the term of this patent is extended or adjusted under 35 U.S.C. 154(b) by 0 days.

(21) Appl. No.: 18/043,844

(22) PCT Filed: Sep. 1, 2021

(86) PCT No.: PCT/EP2021/074116
§ 371 (c)(1),
(2) Date: Mar. 2, 2023

(87) PCT Pub. No.: WO2022/049115
PCT Pub. Date: Mar. 10, 2022

(65) Prior Publication Data
US 2023/0242416 A1 Aug. 3, 2023

(30) Foreign Application Priority Data

Sep. 3, 2020 (DE) .................. 10 2020 123 004.4
Sep. 3, 2020 (DE) .................. 10 2020 123 005.2
Mar. 22, 2021 (DE) .................. 10 2021 107 068.6

(51) Int. Cl.
*C02F 1/00* (2023.01)
*B01D 27/08* (2006.01)
*B01D 35/027* (2006.01)

(52) U.S. Cl.
CPC .............. *C02F 1/003* (2013.01); *B01D 27/08* (2013.01); *B01D 35/0276* (2013.01);
(Continued)

(58) Field of Classification Search
CPC .......... B01D 35/306; B01D 2201/4046; B01D 2201/4053; B01D 2201/4061; B01D 2201/4076
See application file for complete search history.

(56) References Cited

U.S. PATENT DOCUMENTS 8,864,866 B2 * 10/2014 Osendorf ............. B01D 46/527
55/498
2006/0054547 A1 3/2006 Richmond et al.
(Continued)

FOREIGN PATENT DOCUMENTS

CN 110494202 A 11/2019
DE 19717054 C2 7/1999
(Continued)

OTHER PUBLICATIONS

International Preliminary Report on Patentability for International Patent Application No. PCT/EP2021/074116, mailing date of Oct. 14, 2022, 13 pages with English Translation.
(Continued)

*Primary Examiner* — Benjamin M Kurtz
(74) *Attorney, Agent, or Firm* — Christopher J. Volkmann; KELLY, HOLT & CHRISTENSON, P.L.L.C.

(57) ABSTRACT

A filter cartridge for a household appliance, which is provided with a filter housing, the wall of which separates a housing internal side from a housing external side. A filter inlet opening which in the operation of the filter cartridge is open in relation to the external environment of the filter housing. A device for water conduction which comprises at least one filter chamber having at least one filter medium and
(Continued)

terminates in a filter outlet opening for suctioning water from the filter cartridge in the interior of the filter housing downstream of the filter inlet opening relative to the flow direction during operation. A filter connection element having an annular filter port which has an annular filter sealing face for the tight connection of the filter cartridge to a tank sealing face in the water tank.

18 Claims, 15 Drawing Sheets

(52) U.S. Cl.
CPC ................ B01D 2201/4023 (2013.01); B01D 2201/4046 (2013.01); C02F 2201/004 (2013.01); C02F 2201/006 (2013.01); C02F 2307/12 (2013.01)

(56) References Cited

U.S. PATENT DOCUMENTS

| | | | |
|---|---|---|---|
| 2009/0242473 A1* | 10/2009 | Wallerstorfer | A47J 31/605 210/232 |
| 2009/0321342 A1 | 12/2009 | Wawrla et al. | |
| 2010/0025317 A1* | 2/2010 | Fall | B01D 29/96 210/232 |
| 2012/0223006 A1 | 9/2012 | Sann et al. | |
| 2021/0101097 A1 | 4/2021 | Rathsmann et al. | |
| 2023/0256366 A1 | 8/2023 | Wallerstorfer | |
| 2023/0256367 A1 | 8/2023 | Wallerstorfer | |
| 2023/0256368 A1 | 8/2023 | Wallerstorfer | |
| 2023/0271116 A1 | 8/2023 | Wallerstorfer | |

FOREIGN PATENT DOCUMENTS

| | | |
|---|---|---|
| DE | 102004049877 A1 | 4/2006 |
| DE | 102006027267 A1 | 1/2007 |
| DE | 102014223648 A1 | 5/2016 |
| DE | 202017102087 U1 | 7/2018 |
| DE | 112017000784 T5 | 10/2018 |
| EP | 1867606 A1 | 12/2007 |
| EP | 2138078 A1 | 12/2009 |
| EP | 2049218 B1 | 6/2015 |
| EP | 2049220 B1 | 4/2016 |
| EP | 2049221 B1 | 4/2016 |
| EP | 2063972 B1 | 4/2016 |
| EP | 2433906 B1 | 6/2016 |
| RU | 2233607 C2 | 8/2004 |
| RU | 2351271 C2 | 4/2009 |
| RU | 2009108267 A | 9/2010 |
| RU | 2144565 C2 | 2/2011 |
| WO | WO2008017492 A2 | 2/2008 |

OTHER PUBLICATIONS

International Search Report and Written Opinion for International Patent Application No. PCT/EP2021/074116, mailing date of Dec. 14, 2021, 18 pages with machine translation in English.
U.S. Appl. No. 18/043,836 Non Final Office Action dated Jul. 18, 2023, 13 pages.
U.S. Appl. No. 18/043,845 Non Final Office Action dated Jul. 13, 2023, 28 pages.
U.S. Appl. No. 18/043,849 Non Final Office Action dated Jun. 22, 2023, 15 pages.
International Preliminary Report on Patentability for International Patent Application No. PCT/EP2021/074116, mailing date of Oct. 14, 2022, 20 pages.
International Search Report for Russian Application No. PCT/EP2021/074116 dated Jul. 20, 2023, 4 pages.
International Search Report for Russian Application No. PCT/EP2021/074148 dated Aug. 21, 2023, 4 pages.
Russian Office Action from Russian Patent Application No. 2023108021 dated Aug. 4, 2023, 10 pages.
International Search Report for Russian Application No. PCT/EP2021/074161 dated Jul. 20, 2023, 4 pages.
First Office Action for German Patent Application No. 102021122619,8 dated Dec. 30, 2023, 14 pages.
First Chinese Office Action for Chinese Application No. 202180073048.3 dated Sep. 27, 2023, 14 pages.

* cited by examiner

FILTER CARTRIDGE

CROSS-REFERENCES TO RELATED APPLICATIONS

This Application is a Section 371 National Stage Application of International Application No. PCT/EP2021/074116, filed Sep. 1, 2021, and published as WO 2022/049115A1 on Mar. 10, 2022, and claims priority to German Application Nos. 10 2021 107 068.6, filed Mar. 22, 2021, 10 2020 123 004.4, filed Sep. 3, 2020, and 10 2020 123 005.2 filed Sep. 3, 2020, the contents of each are hereby incorporated by reference in their entirety.

DETAILED DESCRIPTION

Figure 1:
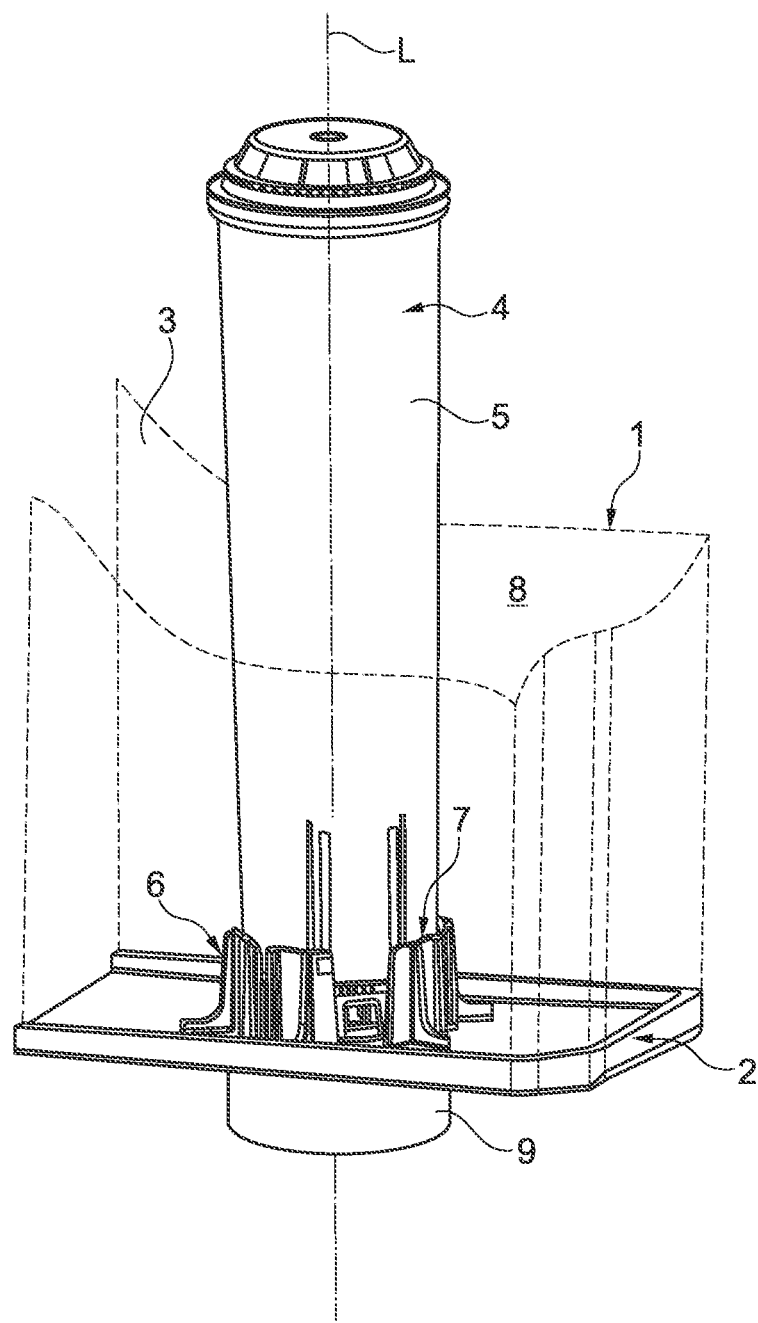
FIG. 1 shows a perspective illustration of a tank bottom with an inserted filter cartridge according to the prior art.

The present disclosure relates to a filter cartridge according to the preamble of claim 1.

Filter cartridges are typically used in water-carrying household appliances with a water tank, in particular in beverage machines such as coffee machines, tea machines, etc., in order to improve the water quality in accordance with the intended application. Filter media for water softening, such as ion exchange resin, or to improve the taste, such as activated carbon, are often used in such filter cartridges. The metered addition of additives, e.g. for health or taste improvement, such as the addition of minerals or vitamins, etc., is already provided for in combination with filter media.

Water tanks of machines of this type according to the prior art typically have tank connection elements on the tank bottom with an annular tank sealing face for the tight connection of a filter connection element of the filter cartridge provided for such a water tank, which enclose a tank passage opening in the tank bottom for the water to flow from the filter cartridge and the water tank to the household appliance.

Such water tanks and filter cartridges are described, for example, in publications DE 10 2004 050 877 A1, EP 1 867 626 A1 and DE 197 17 056 C2.

To prevent unsuitable filter cartridges from being used, the tank connection elements have already been provided with coding elements so that only filter cartridges that match these coding elements can be used.

Document EP 2 138 078 A1 discloses a connection device for permanently connecting to a tank bottom, which has pocket-shaped connection elements for connecting to the tank bottom. These are connected with tank-proximal fixing means in such a way that they can no longer be released in a non-destructive manner from the tank. A filter cartridge is then to be inserted into this connection device in a replaceable manner, wherein the connection device and the filter cartridge have hexagonal coding structures.

In certain embodiments, which are disclosed for example in publications WO 2008/017492 A2, EP 2 433 906 B1, EP 2 065 972 B1, EP 2 050 220 B1, EP 2 050 221 B1 and EP 2 050 218 B1, the filter sealing faces and the tank sealing faces have a polygonal shape provided for coding, so that apart from the sealing function an additional coding function is also performed by the seal itself.

These embodiments have the disadvantage that the angular contour makes it more difficult to implement the sealing function in comparison to a round contour.

An object of the present disclosure is therefore to refine such a filter cartridge in such a manner that the coding function mentioned is made possible without such disadvantages.

Proceeding from a filter cartridge according to the preamble of claim 1, this object is achieved by the characterizing features thereof.

In the following, elements to be assigned to the filter cartridge are generally provided with the assigning word beginning "filter" and elements to be assigned to the water tank are provided with the assigning word beginning "tank". Features of advantageous embodiments and refinements of the present disclosure are described below in such a way that they are not mandatory, but may be present.

A filter cartridge according to one example is provided with a filter housing, the wall of which separates a housing internal side from a housing external side, wherein an open filter inlet opening is provided for water to enter from the water supply without any further connection elements, which, accordingly when used in a water tank, in the operating position of the filter cartridge is connected to the tank interior. Downstream of the filter inlet opening relative to the direction of flow during operation, a device for water conduction is provided in the interior of the filter housing, which comprises at least one filter chamber having at least one filter medium and terminates in a filter outlet opening for suctioning water from the filter cartridge. A filter connection element is provided with an annular filter port, which has an annular filter sealing face for the tight connection of the filter cartridge to a tank sealing face in the water tank.

As a result of this design embodiment, such a filter cartridge differs from filter cartridges of filter devices whose housings are connected tightly to water pipes of a water network with pressure-resistant connections and are thus integrated into the water network.

A filter cartridge according to one example has a filter sealing face, the profile of which along the circumference of the annular filter port has a variable radius in relation to a central axis, so that the filter sealing face comprises radial convexities and/or radial concavities, wherein the convexities and/or concavities have a round profile, so that corners or edges are avoided.

As a result, there are further possibilities for coding. This shape of the filter sealing face matches a corresponding shape of a tank sealing face, with the curvatures changing from the external side to the internal side and vice versa over the profile of the circumference making it more difficult or completely impossible to push or plug a shaped seal that is not adapted in shape onto or into a tank sealing surface. The radial convexities and/or concavities mimic the shape of an annular spring, the circumference of which can be resiliently expanded or compressed. The spring effect also improves the sealing effect, since the filter sealing face is pressed flat against the associated tank sealing face by the spring pressure. The filter sealing face and the tank sealing face can also be used to fix the filter cartridge and then form a filter fixing face or a tank fixing face. This fixing function in the interaction of the filter sealing face and the tank sealing face is improved by such a spring effect.

The resilient deformability of the filter sealing face can be improved in that the annular filter port of the filter connection element having the filter sealing face in the region of the filter sealing face has an annular wall having a wall internal side and a wall external side that run parallel or inclined to one another. Depending on whether the connector is pushed onto a tank fixing face or plugged into a tank sealing face, either the wall external side or the wall internal side of the annular wall comprises or forms the filter sealing face.

Since in this embodiment the side of the wall opposite the filter sealing face has the same shape having a correspondingly larger or smaller circumference, this wall is configured overall as an annular spring. The annular wall then forms an annular spring with parallel or mutually inclined circumferential sides.

The annular filter port of the filter connection element, which has the filter sealing face, at least in the region of the filter sealing face, can consist of a plastic that is more dimensionally stable at the operating temperature than an elastomer. Due to this strength, the filter port of the filter cartridge is able to exert a contact pressure on a tank-proximal tank sealing face in order to establish the tight connection without impairing its shape.

Such a dimensionally stable plastic is stronger than an elastomer, so that an elastomer seal on the water tank side can be deformed by the filter port. A contact pressure can be generated as a result. Deformation of an elastomer seal can also cause one or more additional functions of the elastomer seal, for example a mechanical or hydraulic function such as a fixing function, a valve function or the like.

This is advantageous, for example, when the filter sealing face forms an external face of the annular filter port of the filter connection element that points away from a central axis of the filter outlet opening. Such a filter port, despite the changing circumferential curvatures, is able to exert a contact pressure outward essentially over the entire circumference when it is inserted into a water tank-proximal water tank seal with a correspondingly radially inward-facing tank sealing face in order to achieve the desired sealing effect and/or fixing effect.

In a further refinement of the present disclosure the arrangement of the convexities and concavities of the filter sealing face is configured so as to be rotationally symmetrical over the circumference. This results in a restoring force of the annular spring that is evenly distributed over the circumference with more stable fixing and sealing of the filter cartridge in the installed position. A rotationally symmetrical configuration of the filter sealing face over the circumference results when the convexities and/or concavities are configured to periodically oscillate around a circular line. This allows for different angular positions of the filter cartridge, making it easier to connect the latter. In addition, other technical functions can also be provided depending on the angle.

More stable fixing of the filter cartridge in the installation position is achieved in that the arrangement of the convexities and concavities of the tank sealing face and/or the filter sealing face is configured with the same angles over the circumference. The annular spring formed in this way can thus deform uniformly over the circumference both in the region of the convexities and in the region of the concavities.

The sealing effect of the filter sealing face having the tank sealing face is improved by a round profile of the convexities and/or concavities, so that corners or edges are avoided. Due to the round profile, avoiding corners or edges in the region of the sealing faces, the sealing function is improved, for example compared to polygonal shapes as in the prior art. An improvement in the mechanical clamping and thus the fixing is also possible due to the variable radius, for example also compared to a circular shape.

The convexities and concavities of the filter fixing face can form a wave shape along a circular line, the wave shape consisting of an alternating sequence of convex circle segments forming the convexities and concave circle segments forming the concavities. A radially directed spring effect results from the profile following a circular line.

The spring action of the annular spring can be further improved if the concave and convex circle segments are connected tangentially at turning points at the transition between concave and convex curvatures.

In a specific embodiment of the present disclosure, the arc length of the convex circle segments is longer than the arc length of the concave circle segments. The swept angle of the convex circle segments is therefore greater than the swept angle of the concave circle segments. As a result, the tangential transition between the curves runs obliquely in relation to a central circle of the annular spring, so that no radially inward- or outward-directed force arises in the transitions during the deformation.

In a specific embodiment, the convex and the concave circle segments have the same segment radius. This results in a comparable force distribution within the segments during deformation.

The circle segments can be disposed in such a way that the convex and the concave circle segments lie within an outer envelope circle and outside an inner envelope circle, with the circle centers of the convex circle segments lying within the inner envelope circle and the circle centers of the concave circle centers lying outside the outer envelope circle. This shape results in a flat profile in relation to the envelope circles or circle segments running along a center line between the envelope circles, as a result of which the widening or shrinking of the annular spring is facilitated.

A good function has been shown when the radius of the inner envelope circle is between 5% and 15% of the radius of the outer envelope circle.

Furthermore, it has proven to be advantageous if the radius of the convex and/or concave circle segments is between 20% and 35% of the radius of the outer envelope circle.

The spring effect of such a spring ring is further counteracted when the wall thickness between the external side of the wall and the internal side of the wall running parallel or inclined thereto is between 7% and 10% of the radius of the outer envelope circle.

In addition, a profile has been shown to be advantageous when the turning points between the curvatures of the concave and convex circle segments are closer to the inner envelope circle than to the outer envelope circle.

The filter sealing face can form an external face of the annular filter port of the filter connection element that points away from a central axis of the filter outlet opening. Such a filter port, despite the changing circumferential curvatures, is able to exert a resilient contact pressure outwards essentially over the entire circumference when it is inserted into an opening on the water tank with a correspondingly radially inward-facing tank fixing face in order to achieve the desired sealing and/or fixing effect. Conversely, when plugged onto a tank connector on the water tank with a correspondingly radially outward-pointing tank sealing face, a resilient contact pressure can be exerted inwards essentially over the entire circumference by a radially inward-pointing filter sealing face, in order to achieve the desired sealing and/or fixing effect.

In a particular embodiment of the present disclosure, a filter fixing face is provided both on the internal side and on the external side of the filter port, one or both of which simultaneously form a filter sealing face. Such a filter port can be inserted into an annular slot on the tank, the side walls of which each form a tank fixing face and/or a tank sealing face.

A constellation that works very well has been found, for example, when six convexities and six concavities are provided along a circular line that has a diameter of less than 3 cm.

The filter inlet opening of the filter cartridge can be configured as an annular screen opening on the outside of the filter port, as a result of which the filter cartridge in the water tank is open to the water contained therein.

The filter cartridge is improved if a guide structure for guiding and receiving a water tank-proximal centering element is provided within the filter port. The filter cartridge can thus be aligned in the axial direction when it is inserted into the associated water tank and fixed in this alignment in the operating position.

If the guide structure has at least one guide groove running in the axial direction, i.e. parallel to the central axis, for accommodating at least one guide rib of the centering element on the water tank, the filter cartridge when it is inserted into the water tank, by way of this guide structure and in interaction with the associated water tank-proximal centering element, can be guided into at least one angular position and additionally fixed there by the axial movement.

In order to provide guiding and fixing in a number of angular positions, the guide structure can have a number of guide grooves distributed around the circumference for this purpose.

Good guiding of the filter cartridge into the desired angular position is obtained when the wall of the guide grooves is radiused in such a manner that the width of the grooves tapers from bottom to top in relation to the operating position. The guiding of the filter cartridge can also be improved if the walls of the guide grooves are radiused in such a manner that the width of the grooves tapers radially from the internal side to the outside. The combination of the two tapering groove shapes results in a type of funnel effect for a rib of a water tank-proximal centering element that enters such a groove.

The groove shapes mentioned can be configured, for example, by means of internal curvatures in a wall of the guide structure connecting the guide grooves.

The shape of the filter sealing face according to one example can also be used to improve the fixing of the filter cartridge, in that the filter sealing face is simultaneously provided as a filter fixing face. The shape of the filter sealing face according to one example, provided as a filter fixing face, facilitates deformation of the filter port in the region of the filter fixing face, since the radial convexities and/or concavities form the shape of an annular spring, the circumference of which can be expanded or compressed in a resilient manner Such a deformation facilitated by the variable radius makes it possible to improve the mechanical clamping and thus the fixing, for example in comparison to a circular shape or a polygonal shape.

The resilient deformability of the filter fixing face can be improved in that the annular filter port of the filter connection element that has the filter fixing face has an annular wall in the region of the filter fixing face with a wall internal side and a wall external side that run parallel to one another. Depending on whether the connector is pushed onto a tank fixing face or plugged into a tank fixing face, either the internal face or the external face of the annular wall comprises or forms the filter fixing face.

Since in this embodiment the side of the wall opposite the filter fixing face has the same shape with a correspondingly larger or smaller circumference, this wall is configured overall as an annular spring. The annular wall then forms an annular spring with parallel or mutually inclined circumferential sides.

Furthermore, the annular filter port of the filter connection element can have an external and/or internal wall which is beveled in relation to the vertical, so that the external wall and the internal wall converge from top to bottom relative to the operating position of the filter cartridge. This results in a guiding aid that facilitates the insertion of the connector into a gap between two suitably shaped tank-proximal surfaces, with the tank-proximal surfaces being able to at least partially form an inner and/or outer tank sealing face.

Accordingly, the beveled external wall can have an outer filter sealing face and/or the beveled internal wall can have an inner filter sealing face in order to establish a sealing form-fit with the corresponding tank sealing face.

An embodiment of the present disclosure is shown in the drawing and is explained in more detail with reference to the following figures.

FIG. 1 visualizes the usual configuration of a water tank 1 of a beverage machine, such as a coffee machine, for example a fully automatic coffee machine according to the prior art. The water tank 1 comprises a tank bottom 2 and water tank side walls 3, partially shown with dashed lines. A filter cartridge 4 with a filter housing 5 is inserted into the water tank 1. The connection between the tank bottom 2 and the filter cartridge 4 is realized via tank connection elements 6 on the water tank and filter connection elements 7 on the filter.

The filter cartridge 4 is located in the interior 8 of the water tank 1, i.e. during operation, it stands entirely or partially in the water stored in the water tank 1. A filter port 9 of the water tank 1 for connecting the water tank 1 to the beverage machine (not shown) protrudes from the lower side of the water tank 1.

Figure 2:
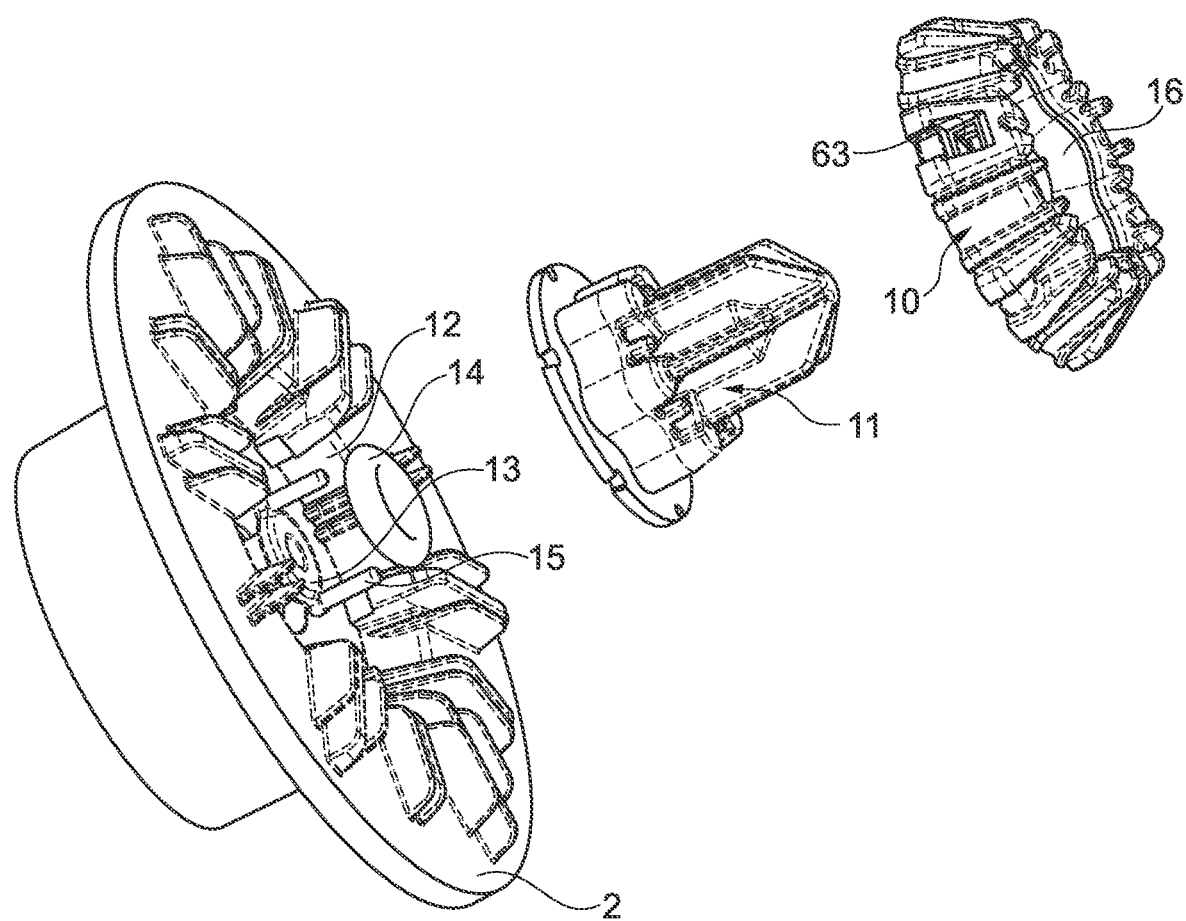
FIG. 2 shows a perspective exploded illustration of a tank bottom with a centering element and a fastening ring, in one example.

Illustrated in FIG. 2 is a round fragment of the tank bottom 2, wherein provided are a fastening ring 10 and a centering element 11 for insertion into a recess 12 in the tank bottom 2. A tank valve body 13 with a seal 14 configured as an O-ring, from which two pins 15 protrude upwards, can likewise be seen in FIG. 2. The fastening ring 10 also carries an elastomer seal 16.

Figure 3:
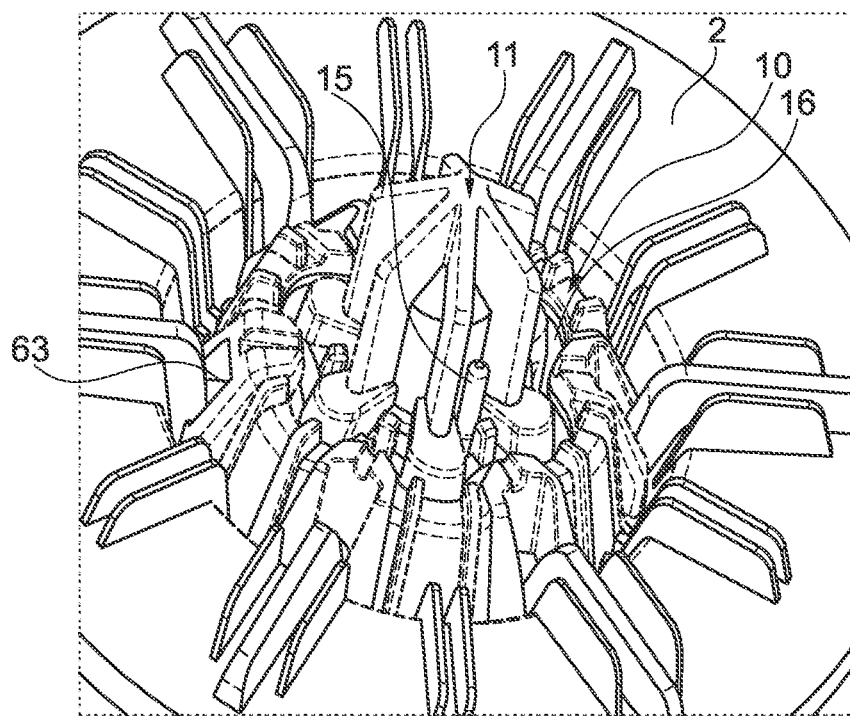
FIG. 3 shows a perspective illustration of the tank bottom according to FIG. 2 with an installed centering element and an installed fastening ring, in one example.
Figure 4:
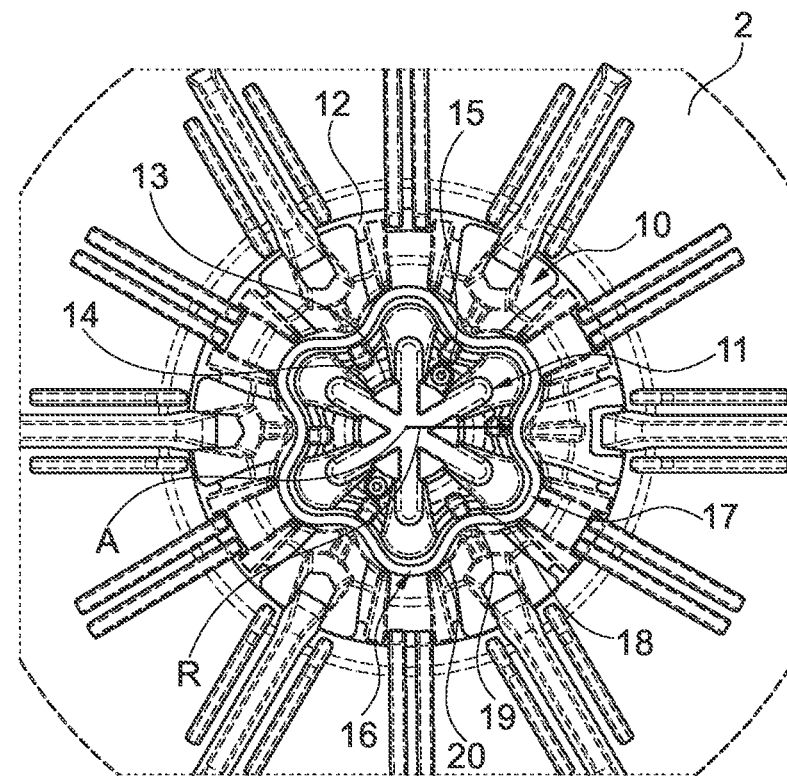
FIG. 4 shows a top view of the tank bottom according to FIGS. 2 and 3.

In FIGS. 3 and 4, the fastening ring 10 and the centering element 11 are installed in the tank bottom 2. It can be seen here that the pins 15 can pass through the centering element and thus form coding elements for coding the water tank in relation to the associated machine connection, by which the tank valve body 13 must be actuated when the water tank is inserted. It is also clearly visible in FIG. 4 that the elastomer seal 16 forming the water tank seal 17 is an annular seal which has a variable radius R along its circumference in relation to a central axis A, so that the internal face of the water tank seal 17 that forms a tank sealing face 18 comprises radial concavities 19 and radial convexities 20. The first tank sealing face 18 simultaneously serves as the first tank fixing face.

Figure 5:
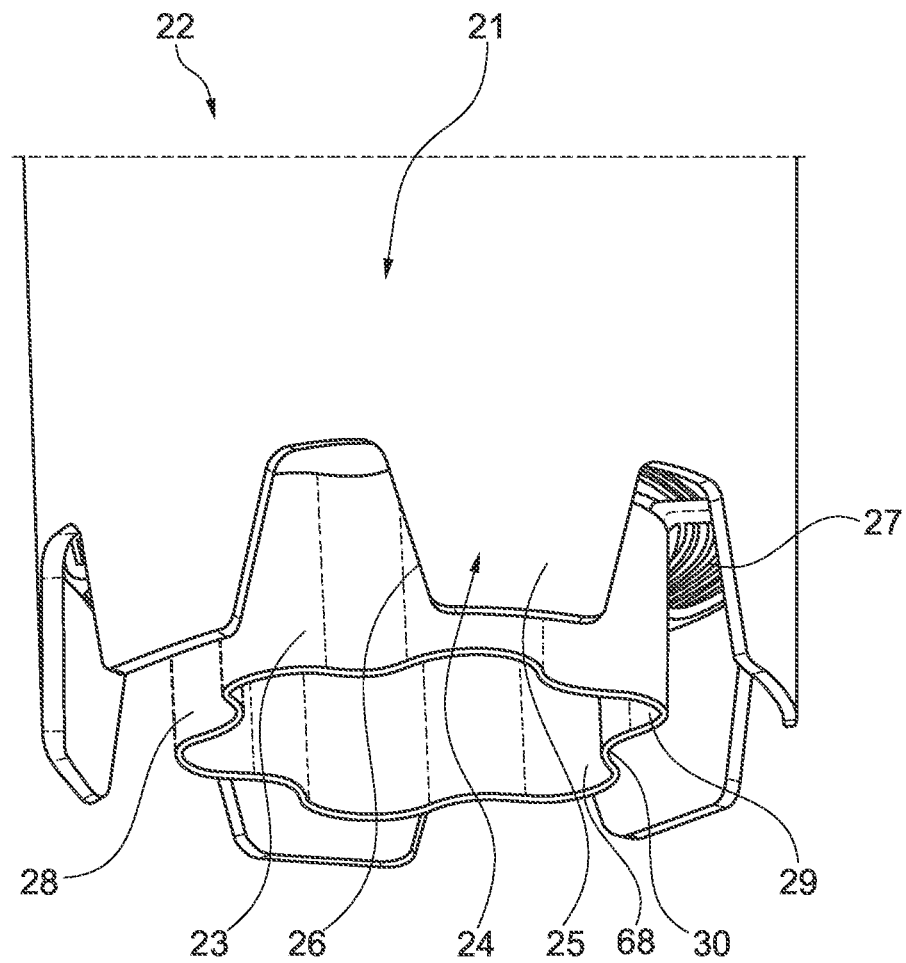
FIG. 5 shows a perspective illustration of the connection region of the filter cartridge viewed from the side, in one example.

In FIG. 5 the connection region 21 of a suitable filter cartridge 22 is shown. A filter port 23 forms an inner ring surrounded by an outer ring 24 with axially extending projections 25 and recesses 26. Between the inner ring 23 and the outer ring 24 is an annular inlet screen 27 through which water enters the filter cartridge. The external face 28 and the internal face 68 of the filter port 23 are also provided with convexities 29 and concavities 30 to match the tank sealing face 18. The external face 28 and/or the internal face 68 of the filter port 23 can simultaneously serve as a filter fixing face.

Figure 6:
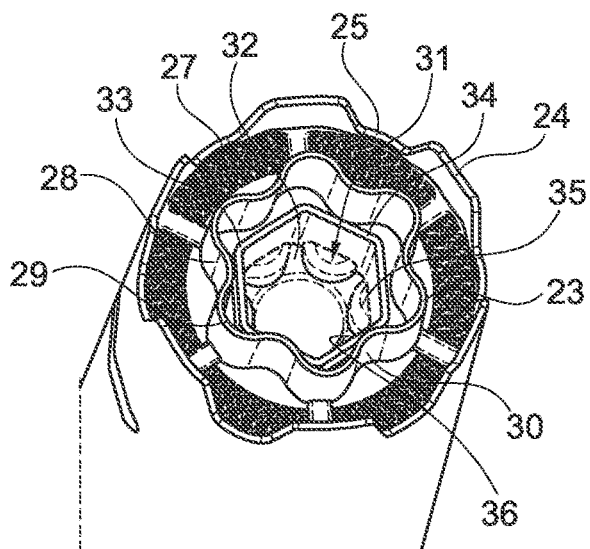
FIG. 6 shows a perspective illustration of the connection region of the filter cartridge viewed obliquely from below, in one example.
Figure 7:
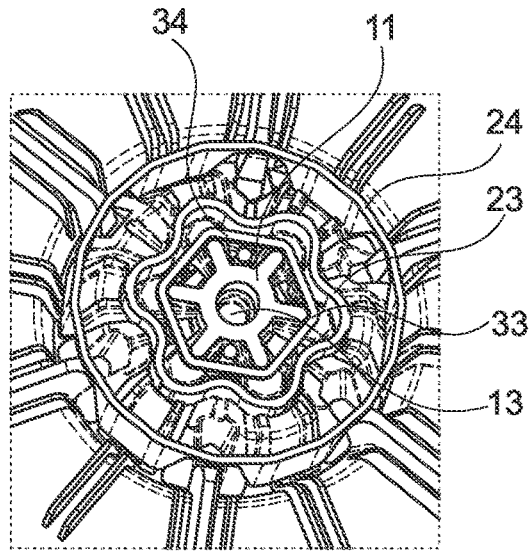
FIG. 7 shows a perspective illustration of a filter cartridge cut open at the level of the filter port, inserted into a tank bottom, in one example.

In the view of FIG. 6, in addition to the parts of the connection region 21 of the filter cartridge 22 described above, the special configuration of a guide structure 31 of the filter cartridge 22 for receiving the centering element 11 is shown. The guide structure has guide grooves 32 which are aligned with the edges 33 of a polygonal ring 34, in the present example with six guide grooves which are aligned with six edges of a hexagonal ring. In the sectional illustration with a view from above according to FIG. 7, the sectional plane goes through this polygonal ring 34.

Figure 8:
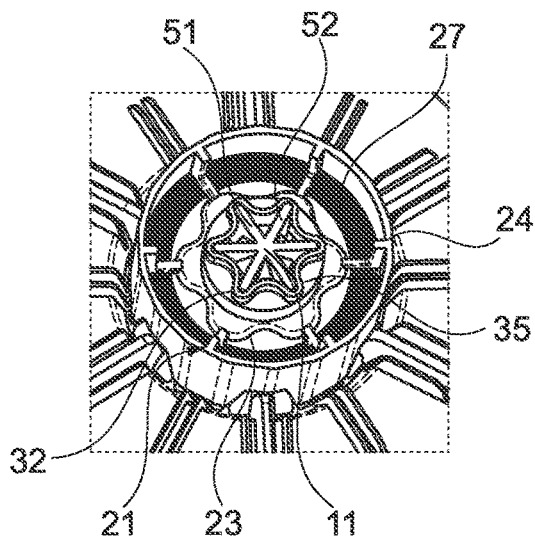
FIG. 8 shows a perspective illustration of a filter cartridge cut open at the level of the guide grooves, inserted into a tank bottom, in one example.

Inner curvatures 35 which lie between the edges 33 and the guide grooves 32 adjoin upward into the interior of the filter cartridge. The inner curvatures 35 form the side walls 36 of the guide grooves 32. Due to this arched shape, the walls 36 of the guide grooves 32 taper both in the axial direction upward (relative to the operating position) and in the radial direction from the inside to the outside. In the intersection point, when viewed from above according to FIG. 8, the section plane runs at a height at which the guide grooves 32 are clearly configured. A riser pipe 37 is connected centrally on the internal side, through which the water entering the filter cartridge 22 is directed upward to the filter section.

Figure 9:
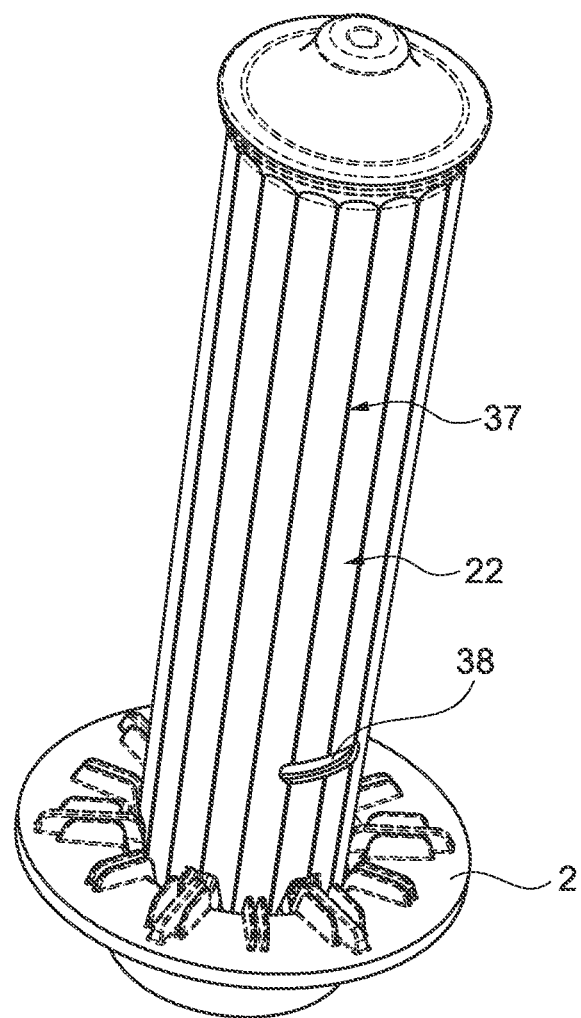
FIG. 9 shows a perspective illustration of a filter cartridge inserted into a tank bottom, in one example.

In FIG. 9 the entire filter cartridge 22 is shown. In a filter housing 37, which has an optional lateral metering opening 38 and the water connection on the bottom described. The optional metering opening 38 is only provided in the case of an embodiment of the filter cartridge that is configured for dispensing additives, e.g. minerals, vitamins or the like, from a metering chamber accommodated in the filter housing 37 into the water reservoir. Since such a metering chamber is closed within the filter housing 37 with respect to the filter section, it has no further significance with regard to the filtration. A filter cartridge according to one example can therefore also be readily constructed without this metering chamber and its metering opening 38. In particular, the operating position can be seen in FIG. 9, to which the statements above and below in this description relate.

Figure 10:
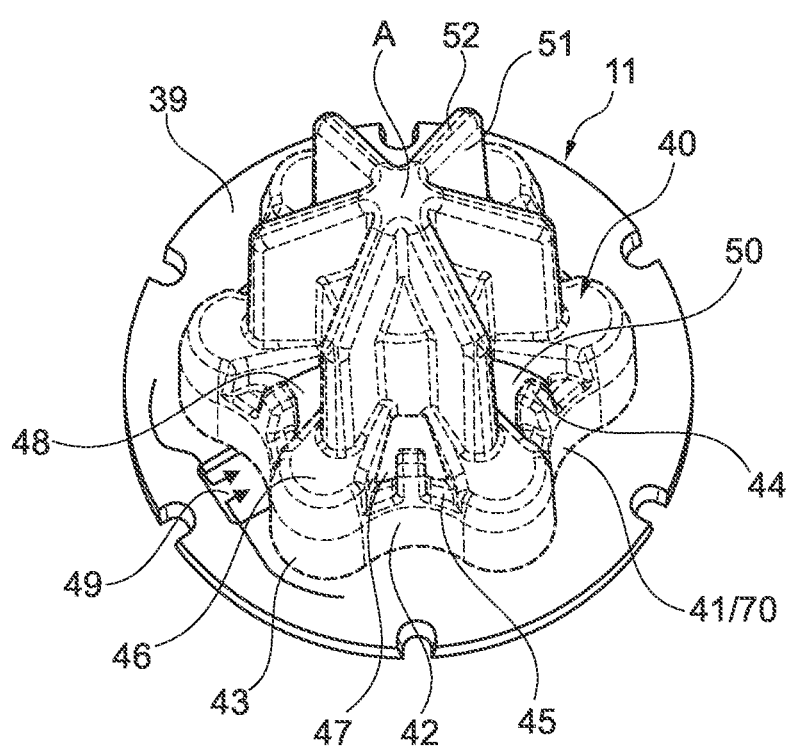
FIG. 10 shows a perspective illustration of the centering element, in one example.

A perspective illustration of the centering element 11 can be seen in FIG. 10. The centering element is provided with a bottom plate 39 which, in the installed state, lies in a receptacle of the elastomer seal and peripherally engages said receptacle from behind. A centering mandrel 40 protrudes upward from the bottom plate 39 and has an annular external face 41 which also forms a second tank fixing face. This external face 41 has a radius that varies along the circumference in relation to the central axis A, so that this external face 41 also comprises radial concavities 42 and convexities 43. The external face 41 is thus adapted to a corresponding shape of the filter port 9.

For further adaptation, the concavities 42 and convexities 43 of this external face 41 are also configured to periodically oscillate around a circular line, and have a round profile. In the illustrated embodiment, six concavities 42 and six convexities 43 are provided along a circular line with a diameter of less than 3 cm, corresponding to the design of the illustrated embodiment of the filter cartridge 22. With a different filter cartridge, the adaptation of the external face 41 or the second tank fixing face must be modified accordingly.

All adaptations to the external face 41 of the centering mandrel 11 result in only an annular slot between the external face 41 and the elastomer seal 16 for inserting the filter port 23 being open in the installed state. This results in a further coding against the use of an unsuitable filter cartridge. In addition, in this way it is possible to support the filter port 23 on its internal side on the external face 41 of the centering mandrel 11. In this way, the contact pressure of the filter port on the elastomer seal 16 can be increased uniformly over the variable shape along the entire peripheral shape.

At least one upwardly projecting tooth 44 is provided above the annular external face. The one tooth or the plurality of teeth 44 are mounted on a gradation 45 of the centering mandrel 40. Further, elevations 46 in relation the gradation 45, which follow the shape of the external face 41, are attached at a distance from the teeth 44, so that a gap 47 remains between the teeth and the elevations 46. The tooth or teeth 44 and/or elevations 46 may prevent the use of an axial seal to bypass the coding. Furthermore, a passage opening 48 is provided above the external face 41, which leads to a tank passage opening when the centering element 11 is in the installed state. The filtered water of a filter cartridge 22 can be discharged from the water tank through this passage opening 48.

One or more bottom vents 49 are provided in the bottom plate 39 below external face 41. Unfiltered water can be directed out of the water tank through these openings in the bottom. Below the elevations 46 and within the wall bearing the external face 41 there is a cavity 50 for receiving the tank valve body 13.

Provided above the annular external face 41 are guide ribs 51 which can be beveled on their upper side as in the exemplary embodiment shown. The guide bevels 52 formed in this way help when inserting the guide ribs 51 into the guide grooves 32 of a filter cartridge 22. In the sectional view according to FIG. 4, the guide bevels 52 of the guide ribs 51 in the attached filter cartridge 22 can be clearly seen.

The assembled components of the water tank 1 for the connection of a filter cartridge with and without a filter cartridge 22 are shown in FIGS. 11, 11a, 11b, 12 and 12a. The fastening ring 10 is provided with a latching projection 53 with which it can latch on the tank bottom 2 by engaging behind a bottom rib 54 of the water tank. The elastomer seal 16 has a bottom section 55 which engages under the fastening ring 10 and thus holds the elastomer seal 16 with the fastening ring 10 on the tank bottom 2.

For sealing in relation to the tank bottom 2, the elastomer seal 16 has a sealing face, which in the present case is realized by a sealing bead 56. For the tight closure of the elastomer seal 16 in relation to the fastening ring 10, a circumferential sealing face can be provided at various points. In the exemplary embodiment shown, an annular seal 57 is provided which is formed on top of the elastomer seal 16 and seals with the latter in a sealing groove 58 of the fastening ring.

The elastomer seal 16 includes an outer ring 59 and an inner ring 60 which are integrally molded and connected to each other. The outer ring 59 and the inner ring 60 in terms of the shape thereof both follow circumferentially the variable radius of fastening ring 10, of the filter port 23 and of the elastomer seal 16 and the concavities and convexities formed thereby. The outer ring 59 is stepped and carries the annular seal 57 and the sealing bead 56. The outer ring 59 is also provided with one or more bypass openings 61 through which unfiltered water can enter the annular gap 62 between the outer ring 59 and the inner ring 60 in the direction of flow P1. In the installed state, the bypass opening 61 of the elastomer seal 16 is located directly after a bypass opening 63 in the fastening ring 11, which can also be seen in FIGS. 1 and 3, for example. Through the bypass opening 63, unfiltered water can flow out of the annular gap 62 from the water tank 1 in the direction P2 into the corresponding beverage machine.

Figure 11:
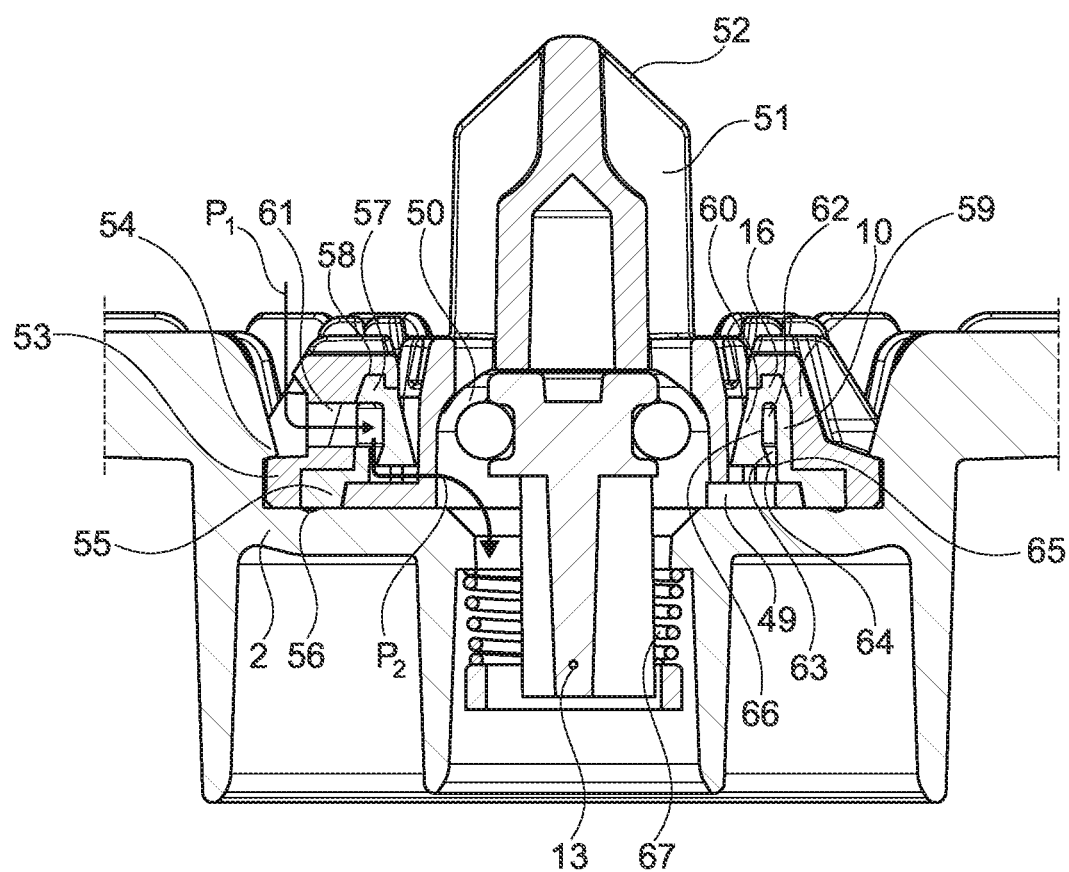
FIG. 11 shows a sectional illustration of a tank bottom without a filter cartridge, with the water tank valve open, in one example.
Figure 11A:
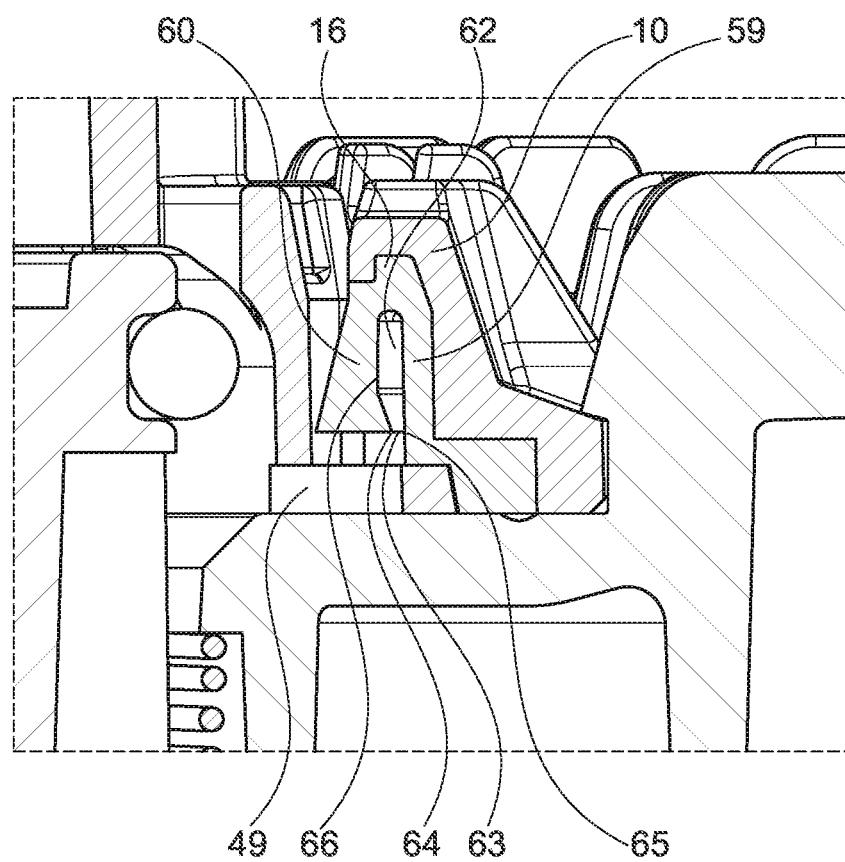
FIGS. 11a and 11b show two enlarged fragments from FIG. 11 to visualize a closable bypass line in the tank seal, in one example.
Figure 11B:
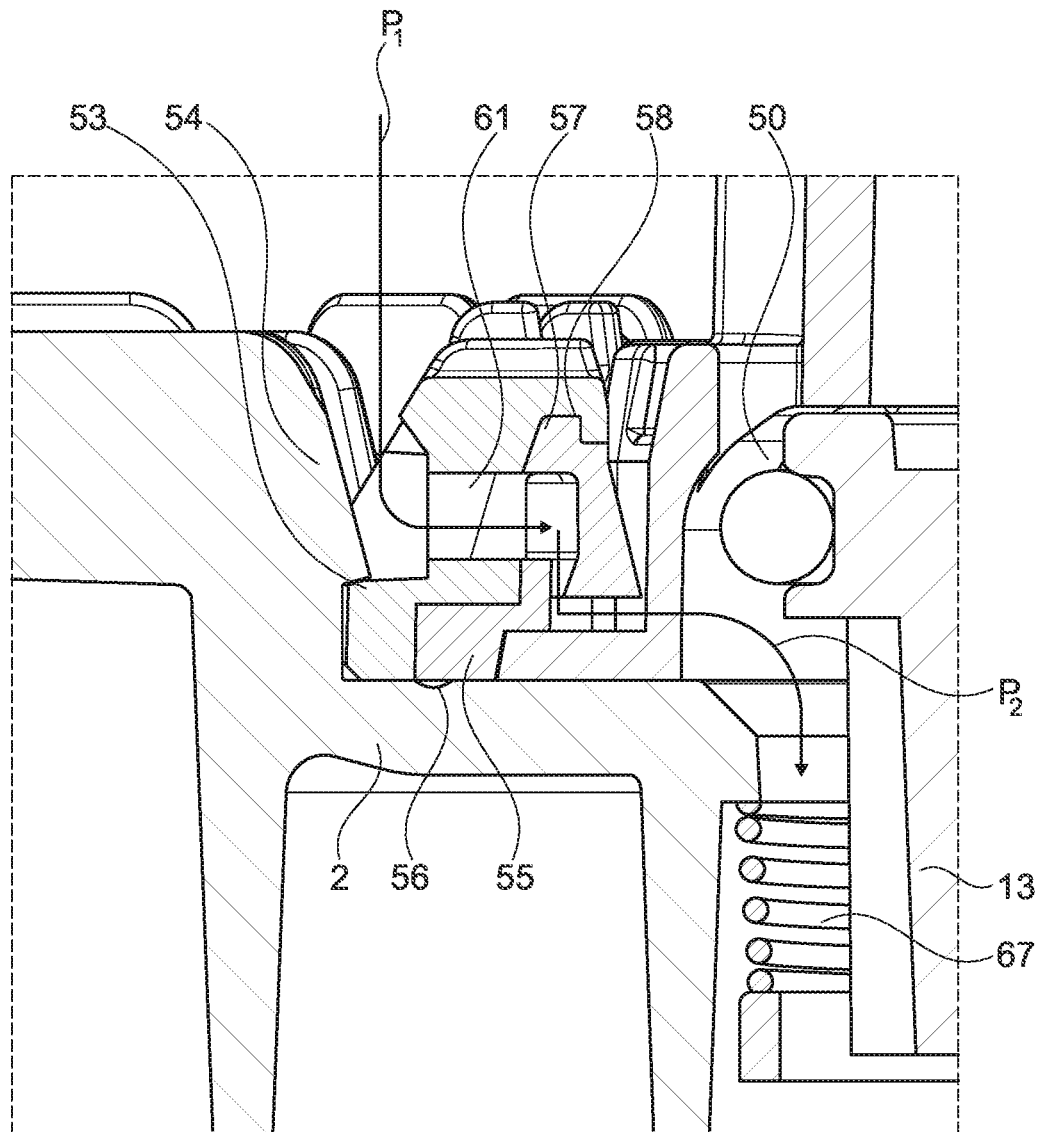

The inner ring 60 has a sealing lip 64 on its lower side, which is opposite a sealing face 65 on the outer ring 59. In the relaxed state of the elastomer seal 16, the annular gap 62 between the outer ring 59 and the inner ring 60 is open at the bottom, as can be seen in FIG. 11, so that the unfiltered water guided in the bypass can flow out of the annular gap 62 in flow direction P2. In this state, the internal side 66 of the inner ring 60, which forms the water tank seal 17, in the downward profile is beveled inward. The design embodiment of the bypass is highlighted in the enlargements according to FIGS. 11a and b.

When a filter cartridge 22 with the filter port 23 is inserted, the elastomer seal 16 is deformed so that the internal side 66 is pressed outward and runs essentially perpendicularly along the filter port. The sealing lip 64 is pressed onto the opposite sealing face 65, and thus the annular gap 62 and thus also the bypass through the bypass openings 61, 63 are closed. The deformation generates a contact pressure that presses the tank sealing face 17 against the filter sealing face 28 and at the same time the sealing lip 64 against the sealing face 65. This state is shown in FIG. 12 and FIG. 12a.

Figure 12:
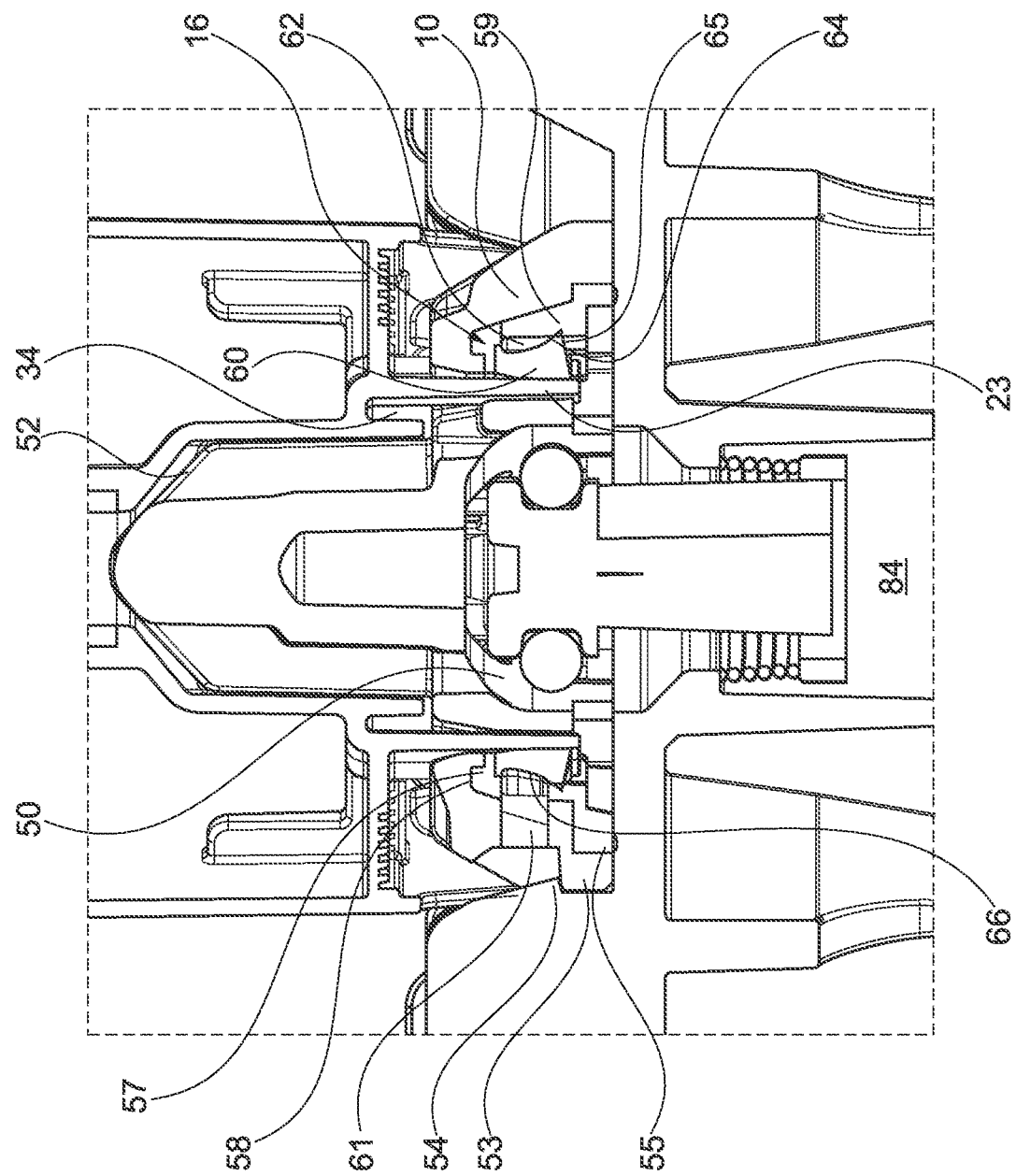
FIG. 12 shows a sectional illustration of a tank bottom according to FIG. 11 with an inserted filter cartridge, in one example.
Figure 12A:
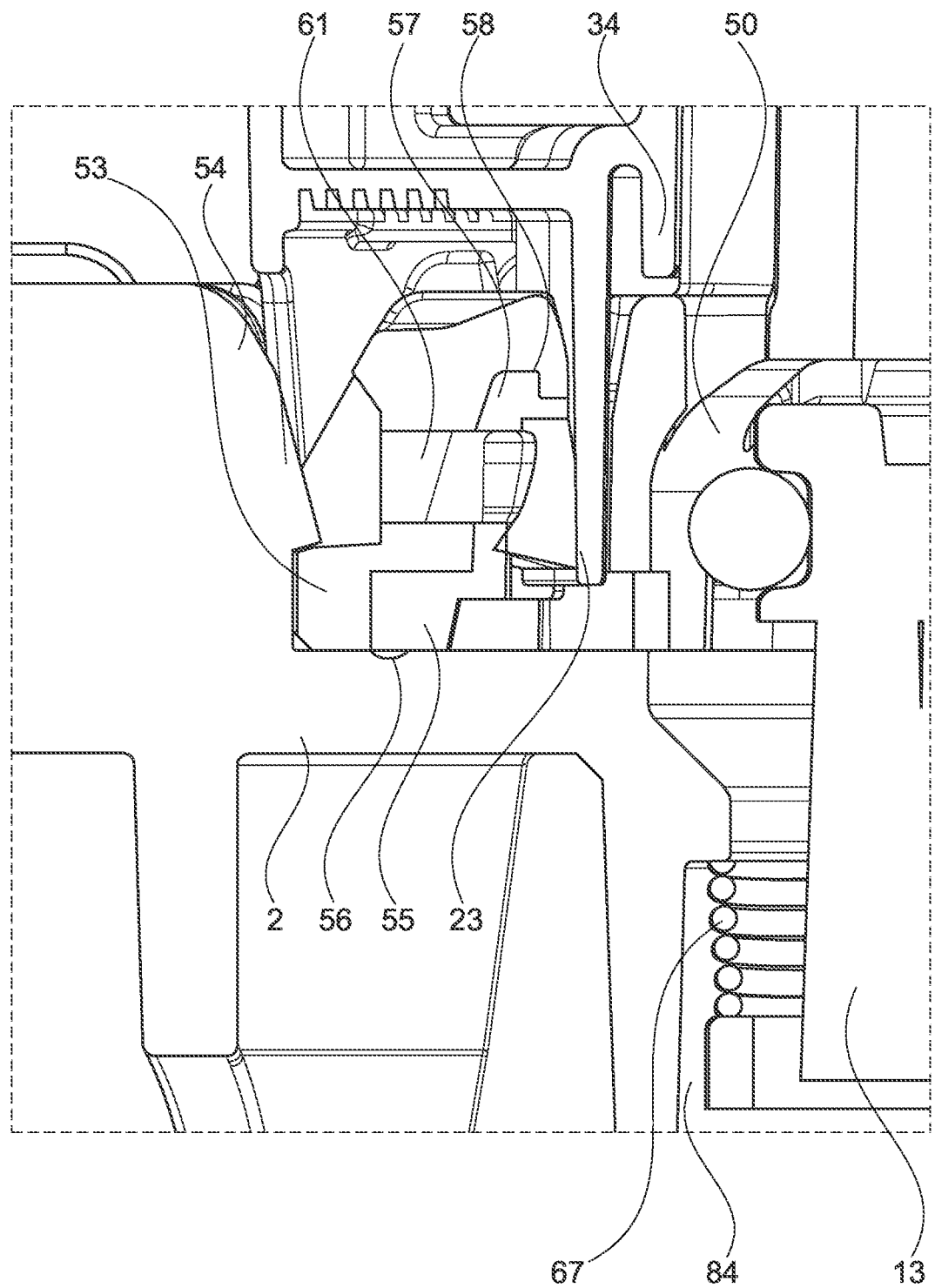
FIG. 12a shows an enlarged detail from FIG. 12 to visualize the closed bypass line, in one example.

The tank valve body 13 in FIG. 11 and in FIG. 12, by a detent (not shown in more detail) of the associated machine is raised counter to a restoring spring 67 into the cavity 50 and is thus in the open position which corresponds to the inserted water tank. If the water tank is removed from the machine, the tank valve body 13 closes under the pressure of the restoring spring 67.

The tank sealing face 18 is formed by the internal side 66 of the elastomer seal 16 and at the same time represents a first tank fixing face 18. As mentioned above, a first filter fixing face 28 formed by the filter sealing face 28 rests on this side when the filter cartridge 5, 22 is in the inserted state, under a contact pressure that deforms the elastomer seal 16 in such a way that a fixing and sealing form-fit is achieved.

A second filter fixing face 68 (see FIG. 5), which is formed by the internal face of the filter port 23, is in contact with the external face 41 forming the second tank fixing face. This form-fit is also formed under a contact pressure. Due to the shape of the filter port 23 according to one example, this forms an annular wall 69 which can be widened in a resilient manner if necessary. This results in the possibility of tolerance compensation with good fixing, which is caused by the corresponding bracing. Due to the mutually parallel or mutually inclined shaping of the first filter fixing face 28 and a second filter fixing face 68, the annular, corrugated wall 69 of the connector 23 lying between them forms a corrugated annular spring 70. The second filter fixing face 68 can also act as a second filter sealing face.

Figure 13:
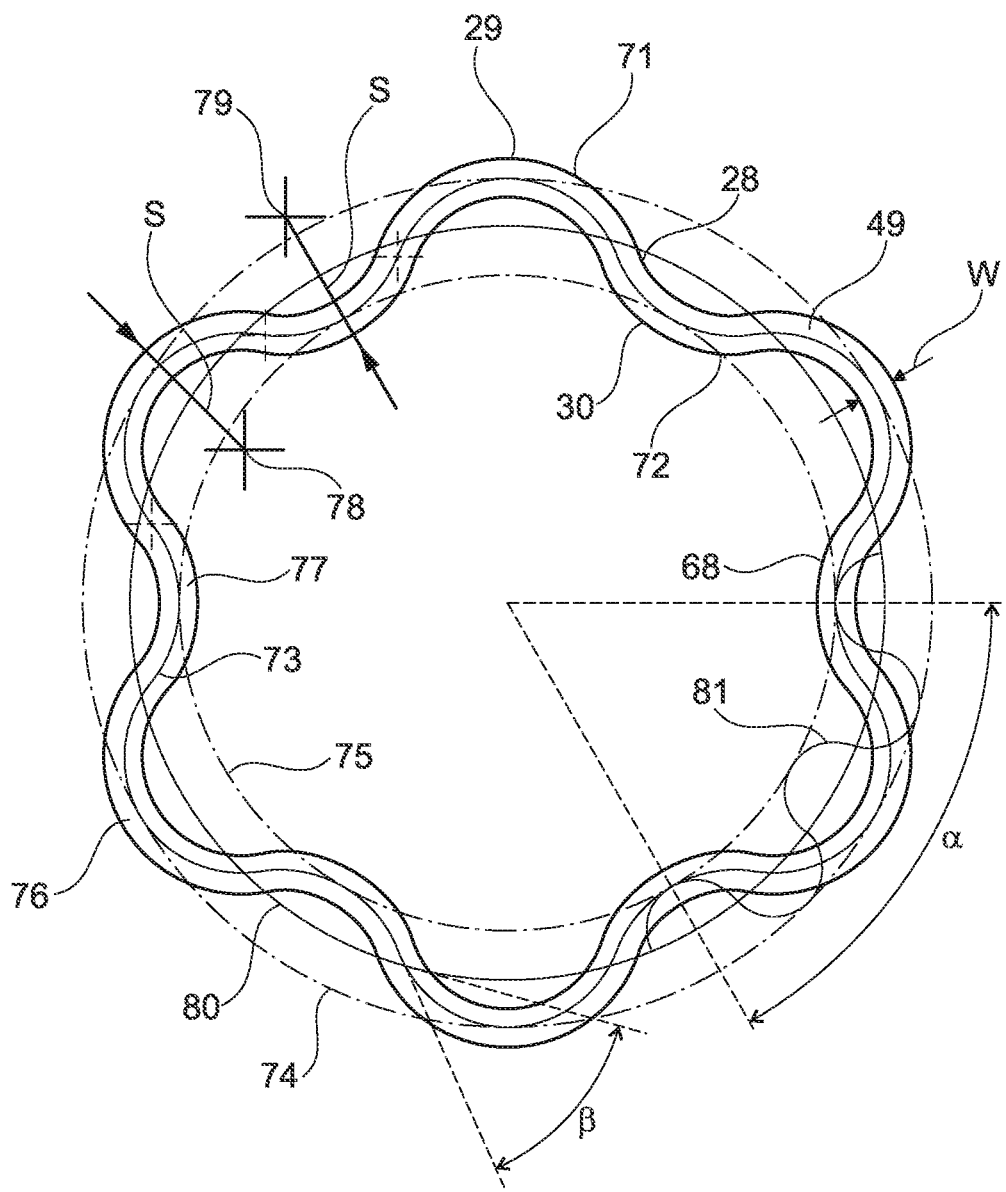
FIG. 13 shows a schematic end view of a filter port, in one example.
Figure 13A:
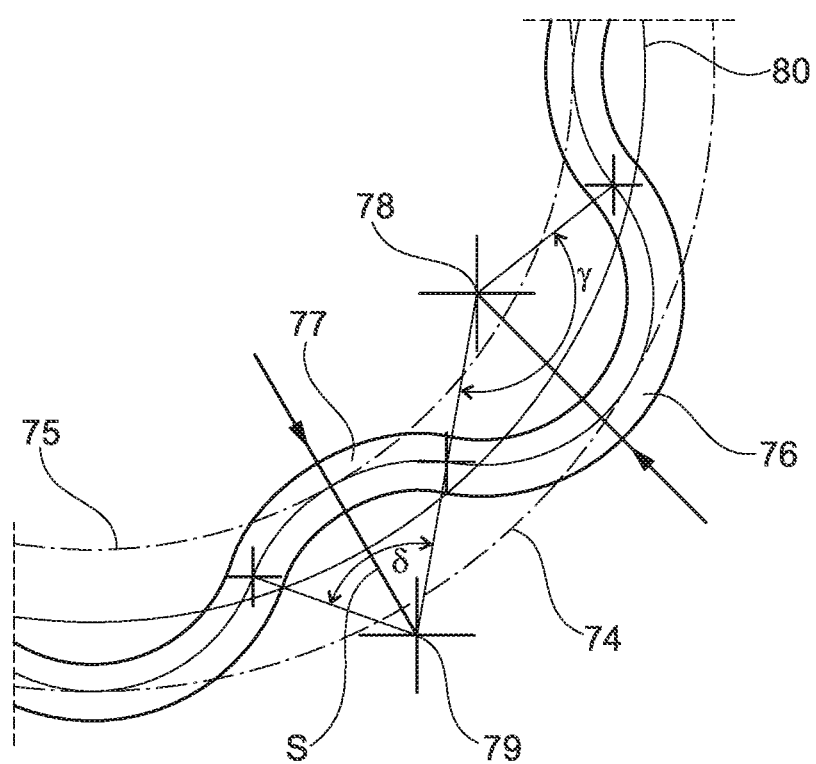
FIG. 13a shows an enlargement of a fragment from FIG. 13.

The filter port according to the end view in FIG. 13 and the enlarged detail according to FIG. 13a shows the wave shape described with convexities 29 and concavities 30. The annular wall 69 of the filter port 23 with a wall thickness W has the first filter fixing face 28 on the wall external side 71 and the second filter fixing face 68 on the wall internal side 72. The wall external side 71 and the wall internal side 72 run parallel in the view shown, but are beveled toward one another in the axial direction, which will be explained further below. The wave shape is therefore further illustrated by means of a center line 73 shown in broken lines.

The center line 73 undulates between an outer envelope circle 74, whose radius has the largest value of the variable radius, and an inner envelope circle 75, whose radius has the smallest radius of the variable radius of the wave shape. The convexities 29 and concavities 30 of the center line 73 form wave crests in the form of convex circle segments 76 and wave troughs in the form of concave circle segments 77. In the illustrated embodiment, all circle segments 76, 77 have the same segment radius S. The centers 78, 79 of the circle segments 76, 77 lie within the inner envelope circle 75 for the convex circle segments 76 and outside of the outer envelope circle 74 for the concave circle segments 77. The convex circle segments 76 and the concave circle segments 77 merge tangentially and are evenly distributed over the circumference, resulting in a rotationally symmetrical shape. In the exemplary embodiment shown, in each case six convex circle segments 76 and six concave circle segments 77 are provided, which alternately lie at an angular distance of 30°, i.e. the convex circle segments 76 lie at an angle α of 60° apart from one another and the same applies to the concave circle segments 77.

Due to the selection of the segment radius and the associated position of the associated centers 78, 79, the center line runs in a comparatively flat, curved, wavy manner around the center circle line 80. The center line 73 intersects the center circle line 80 at an obtuse angle β. As a result, the arc length of the convexities 29 is significantly longer than the arc length of the concavities 30, as a result of which the angle γ swept by the segment arc of the convexities 29 is significantly larger than the angle δ swept by the concavities 30. This shape improves the spring effect of the filter port 23.

For comparison, the drawing also shows circle segments 81 whose segment centers 82 lie directly on the center line 73. This profile, which is not realized in this embodiment, has significantly smaller segment radii and a profile that is essentially perpendicular to the center line 73.

A good spring effect has been shown with radii and wall thicknesses in which the radius of the inner envelope circle 75 is between 5% and 15% of the radius of the outer envelope circle 74 and the radius of the convex and/or concave circle segments is between 20% and 35% of the radius of the outer envelope circle 74. The wall thickness W between the wall external side 71 and the wall internal side 72 running parallel or inclined thereto (relative to the operating position) is preferably between 5% and 15% of the radius of the outer envelope circle 74.

In the example shown, the outer envelope circle 74 has a radius of approximately 11 mm and the inner envelope circle 75 has a radius of approximately 9.75 mm. The segment radius of the convex and concave circle segments is approx. 3.08 mm and the wall thickness between the wall external side 71 and the wall internal side 72 running parallel or inclined thereto is approx. 0.9 mm.

Figure 14:
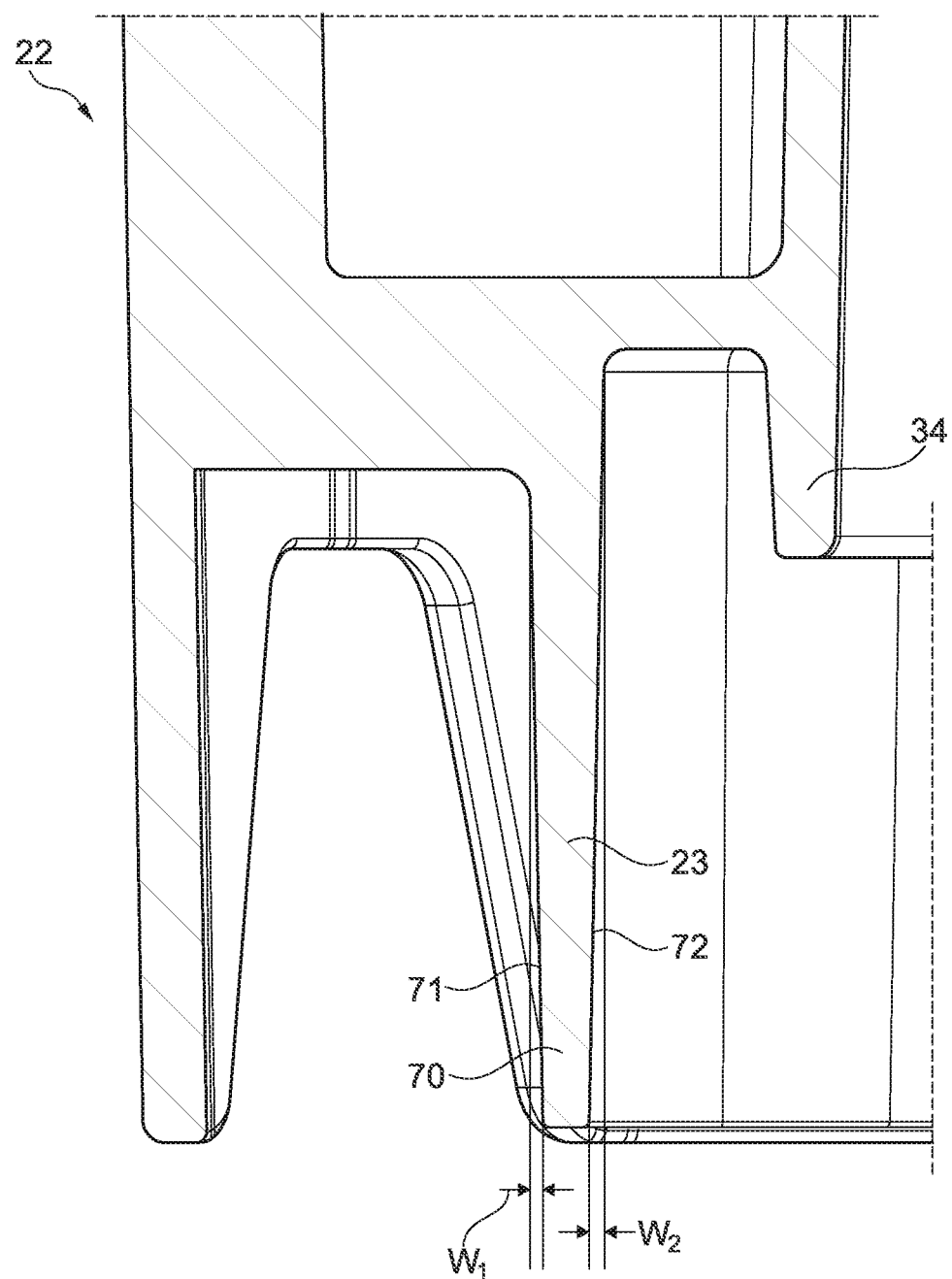
FIG. 14 shows a fragment of the filter cartridge showing the connection region to illustrate a guiding aid by bevels on the connector, in one example.

In FIG. 14 it can be seen that the external 71—and/or the internal wall 72 of the filter port 23, which depending on the embodiment also form one or two filter sealing faces 28, are beveled by the angle $\omega 1$ or $\omega 2$ in relation to the vertical, so that they based on the operating position of the filter cartridge 4, 22 converge from top to bottom. This bevel or bevels by the angle or angles $\omega 1$ and/or $\omega 2$ form an insertion aid when inserting the connector 23 into the annular gap between the elastomer seal 16 and the external face 41 of the water tank 1.

Although the present invention has been described with reference to preferred embodiments, workers skilled in the art will recognize that changes may be made in form and detail without departing from the spirit and scope of the invention.

LIST OF REFERENCE SIGNS

1 Water tank
2 Tank bottom
3 Water tank side wall
4 Filter cartridge
5 Filter housing
6 Tank connection element
7 Filter connection
8 Interior
9 Filter port
10 Fastening ring
11 Centering element
12 Depression
13 Tank valve body
14 Seal
15 Pin
16 Elastomer seal
17 Water tank seal/annular seal
18 Tank sealing face
19 Concavity
20 Convexity
21 Connection region
22 Filter cartridge
23 Filter port/inner ring
24 Outer ring
25 Projection
26 Recess
27 Inlet screen
28 Filter sealing face/external face
29 Convexity
30 Concavity
31 Guide structure
32 Guide groove
33 Edge
34 Polygonal ring
35 Internal curvature
36 Wall
37 Filter housing
38 Metering opening
39 Bottom plate
40 Centering mandrel
41 External face
42 Concavity
43 Convexity
44 Tooth
45 Gradation
46 Elevation
47 Gap
48 Passage opening
49 Bottom vent
50 Cavity
51 Guide rib
52 Guide ramp
53 Latching projection
54 Bottom rib
55 Bottom portion
56 Sealing bead
57 Annular seal
58 Sealing groove
59 Inner ring
60 Outer ring
61 Bypass opening
62 Annular gap
63 Bypass opening
64 Sealing lip
65 Sealing face
66 Internal side
67 Restoring spring
68 Second filter fixing face/internal face
69 Wall
70 annular spring
71 Wall external side
72 Wall internal side
73 Center line
74 Outer envelope circle
75 Inner envelope circle
76 Convex circle segment
77 Concave circle segment
78 Center
79 Center
80 Center circle line
81 Circle segment
82 Segment center
83 Turning point
84 Tank passage opening
A Axis
W Wall thickness
S Segment radius
P1 Flow direction
P2 Flow direction

The invention claimed is:

1. A filter cartridge for a household appliance, which is provided with: a filter housing having a filter housing wall which separates a housing internal side from a housing external side, a filter inlet opening which, in an operation of the filter cartridge, is open in relation to an external environment of the filter housing, a guide structure proximate the filter inlet opening for guiding and receiving a tank-proximal centering element, a device for water conduction disposed in an interior of the filter housing downstream of the filter inlet opening relative to a flow direction during operation, the device comprises at least one filter chamber having at least one filter medium and terminates in a filter outlet opening for suctioning water from the filter cartridge, and a filter connection element having a filter port which has a filter sealing face for connection of the filter cartridge to a tank sealing face in a water tank, wherein
a profile of the filter sealing face comprises a first wall along a circumference of the filter port and has a variable radius in relation to a central axis, so that the first wall comprises radial convexities and radial concavities, wherein the radial convexities and the radial concavities have a round profile and periodically oscillate around a circular line,
the radial convexities form convex circular segments,
the radial concavities form concave circular segments,
the guide structure comprises a second wall disposed between the central axis and the first wall,
the second wall comprises a second wall external side and a second wall internal side,
the guide structure comprises at least one guide groove, each guide groove, of the at least one guide groove, is positioned on the second wall internal side, such that each guide groove faces toward the central axis, and
each guide groove, of the at least one guide groove, is radially aligned, relative to the central axis, with a respective radial convexity, of the radial convexities of the first wall, and is configured to receive a portion of the tank-proximal centering element.

2. The filter cartridge as claimed in claim 1, wherein the filter port of the filter connection element, which has the filter sealing face, consists at least in a region of the filter sealing face of a plastic which is dimensionally stable at an operating temperature and is stronger than an elastomer.

3. The filter cartridge as claimed in claim 1, wherein the filter sealing face forms an external face of the filter port of the filter connection element that points away from the central axis of the filter outlet opening.

4. The filter cartridge as claimed in claim 1, wherein the arrangement of the convexities and concavities of the filter sealing face is configured so as to be rotationally symmetrical over the circumference.

5. The filter cartridge as claimed in claim 1, wherein six convexities and six concavities are aligned with a circular line which has a diameter of less than 3 cm.

6. The filter cartridge as claimed in claim 1, wherein the second wall comprises a polygonal shape.

7. The filter cartridge as claimed in claim 1, wherein the at least one guide groove comprises a plurality of guide grooves.

8. The filter cartridge as claimed in claim 7, wherein the guide structure includes a plurality of protrusions radially aligned with a respective radial concavity, of the radial concavities of the filter sealing face, to distribute the plurality of guide grooves around a circumference of the filter inlet opening.

9. The filter cartridge as claimed in claim 8, wherein each protrusion, of the plurality of protrusions, includes a wall radiused in such a manner that a width of the plurality of guide grooves tapers in an axial direction with respect to the central axis.

10. The filter cartridge as claimed in claim 8, wherein each protrusion, of the plurality of protrusions, includes a wall radiused in such a manner that a width of the plurality of guide grooves tapers from the radial direction with respect to the central axis.

11. The filter cartridge as claimed in claim 8, wherein a tapered shape of each guide groove, of the plurality of guide grooves, is configured as an outer curvature of each protrusion in the plurality of protrusions.

12. The filter cartridge as claimed in claim 1, wherein the filter inlet opening of the filter cartridge is configured as an annular screen opening.

13. The filter cartridge as claimed in claim 1, wherein the first wall includes a first wall external side which runs parallel or inclined to a first wall internal side and comprises or forms the filter sealing face.

14. The filter cartridge as claimed in claim 13, wherein at least one of the first wall external side or the first wall internal side is beveled, in relation to the operating position of the filter cartridge, at an angle $\omega 1$ and/or $\omega 2$ to the vertical so that the first wall external side and the first wall internal side of the filter cartridge converge from top to bottom in a manner inclined to one another.

15. The filter cartridge as claimed in claim 14, wherein at least one of:
the first wall external side has an outer filter sealing face, or
the first wall internal side has an inner filter sealing face.

16. The filter cartridge as claimed in claim 8, wherein a pair of protrusions, of the plurality of protrusions, are radially spaced apart around the circumference of the filter inlet opening to form the at least one guide groove.

17. The filter cartridge as claimed in claim 1, wherein the second wall comprises a perimeter having a polygonal shape.

18. The filter cartridge as claimed in claim 1, wherein the first wall comprises a first wall external side and a first wall internal side, and the first wall internal side faces the second wall external side.

* * * * *